United States Patent
Chung et al.

(10) Patent No.: US 9,408,023 B2
(45) Date of Patent: Aug. 2, 2016

(54) SHORT-RANGE WIRELESS COMMUNICATION ACCESS DEVICE, PORTABLE TERMINAL FOR DISCOVERING SHORT-RANGE WIRELESS COMMUNICATION ACCESS DEVICE, AND SHORT-RANGE WIRELESS COMMUNICATION SYSTEM

(71) Applicant: A2UICT CO., LTD., Seongnam-si, Gyeonggi-do (KR)

(72) Inventors: Sung Hyun Chung, Seongnam-si (KR); Min Joong Rim, Seoul (KR)

(73) Assignee: A2UICT CO., LTD., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/758,952

(22) PCT Filed: Nov. 29, 2013

(86) PCT No.: PCT/KR2013/010947
§ 371 (c)(1),
(2) Date: Jul. 1, 2015

(87) PCT Pub. No.: WO2014/112714
PCT Pub. Date: Jul. 24, 2014

(65) Prior Publication Data
US 2015/0373485 A1    Dec. 24, 2015

(30) Foreign Application Priority Data
Jan. 16, 2013    (KR) .................. 10-2013-0004938

(51) Int. Cl.
*H04W 4/00* (2009.01)
*H04W 48/10* (2009.01)
*H04W 8/00* (2009.01)
*H04W 74/08* (2009.01)
*H04W 52/02* (2009.01)
*H04W 88/06* (2009.01)

(52) U.S. Cl.
CPC .............. *H04W 4/008* (2013.01); *H04W 8/005* (2013.01); *H04W 48/10* (2013.01); *H04W 52/0277* (2013.01); *H04W 74/08* (2013.01); *H04W 88/06* (2013.01); *Y02B 60/50* (2013.01)

(58) Field of Classification Search
CPC ..................................................... H04W 4/008
USPC ...................................... 455/41.1, 41.2, 552.1
See application file for complete search history.

(56) References Cited

U.S. PATENT DOCUMENTS 7,596,385 B2 *    9/2009    Aghvami ............ H04L 12/5695
                                              455/168.1
8,947,257 B2 *    2/2015    Ree .......................... 340/870.01

FOREIGN PATENT DOCUMENTS

| JP | 2009-302799 A | 12/2009 |
| KR | 10-2005-0063216 A | 6/2005 |
| KR | 10-2008-0050201 A | 6/2008 |

OTHER PUBLICATIONS

International Search Report for PCT/KR2013/010947 mailed Mar. 18, 2014 from Korean Intellectual Property Office.

*Primary Examiner* — Tuan H Nguyen
(74) *Attorney, Agent, or Firm* — Revolution IP, PLLC (57) ABSTRACT

A short-range wireless communication access device controls a first network interface to send broadcast radio data packets for allowing a portable terminal to discover the short-range wireless communication access device in a specified first time range, on the basis of time synchronized with the portable terminal to access a short-range wireless communication network. Further, the short-range wireless communication access device receives operation scenario information for controlling whether to send the broadcast radio data packets through a second network interface, and controls the first network interface to cyclically send the broadcast radio data packets in accordance with a repetition cycle in the first time range based on the repetition cycle included in the operation scenario information, the specified first time range in the repetition cycle, and the time determined from the radio signal received through the second network interface.

9 Claims, 7 Drawing Sheets

SHORT-RANGE WIRELESS COMMUNICATION ACCESS DEVICE, PORTABLE TERMINAL FOR DISCOVERING SHORT-RANGE WIRELESS COMMUNICATION ACCESS DEVICE, AND SHORT-RANGE WIRELESS COMMUNICATION SYSTEM

CROSS REFERENCE TO PRIOR APPLICATIONS

This application is a National Stage Application of PCT International Patent Application No. PCT/KR2013/010947 filed on Nov. 29, 2013, under 35 U.S.C. §371, which claims priority to Korean Patent Application No. 10-2013-0004938 filed on Jan. 16, 2013, which are all hereby incorporated by reference in their entirety.

TECHNICAL FIELD

The present invention relates to a short-range wireless communication access device, a portable terminal for discovering a short-range wireless communication access device, and a short-range wireless communication system, and more particularly, to a short-range wireless communication access device, a portable terminal for discovering the short-range wireless communication access device, and a short-range wireless communication system for sharing information related to time between the short-range wireless access device and the portable terminal to reduce consumed power by the portable terminal.

BACKGROUND ART

As communication technology advances, evolution of 3G mobile communication systems is about to reach their fourth generation (4G). Such a 4G mobile communication system enables portable terminals capable of using mobile communication systems to be based on IP (Internet Protocol) in communication, and implement fast upload and download speeds.

Evolution for reaching the 4G mobile communication system contributes to sending/receiving user data even faster. On the contrary, portable terminals are expected to consume more power to cause the available time of portable terminals to be reduced.

Accordingly, there is a need for developing a method for improving battery life on portable terminals in line with emerging 4G mobile communication systems.

The exemplary Green-T(echnology) of EUREKA project has studied the technology for minimizing power consumed by the 4G portable terminals by adopting the heterogeneous radio access technology in order to overcome the aforementioned energy trap thereof.

In particular, the Green-T project aims to develop a method for implementing data communication by using a neighboring short-range wireless communication system if much transmission power is required for sending/receiving data to/from a base station because terminals are far away from the base station.

Figure 1:
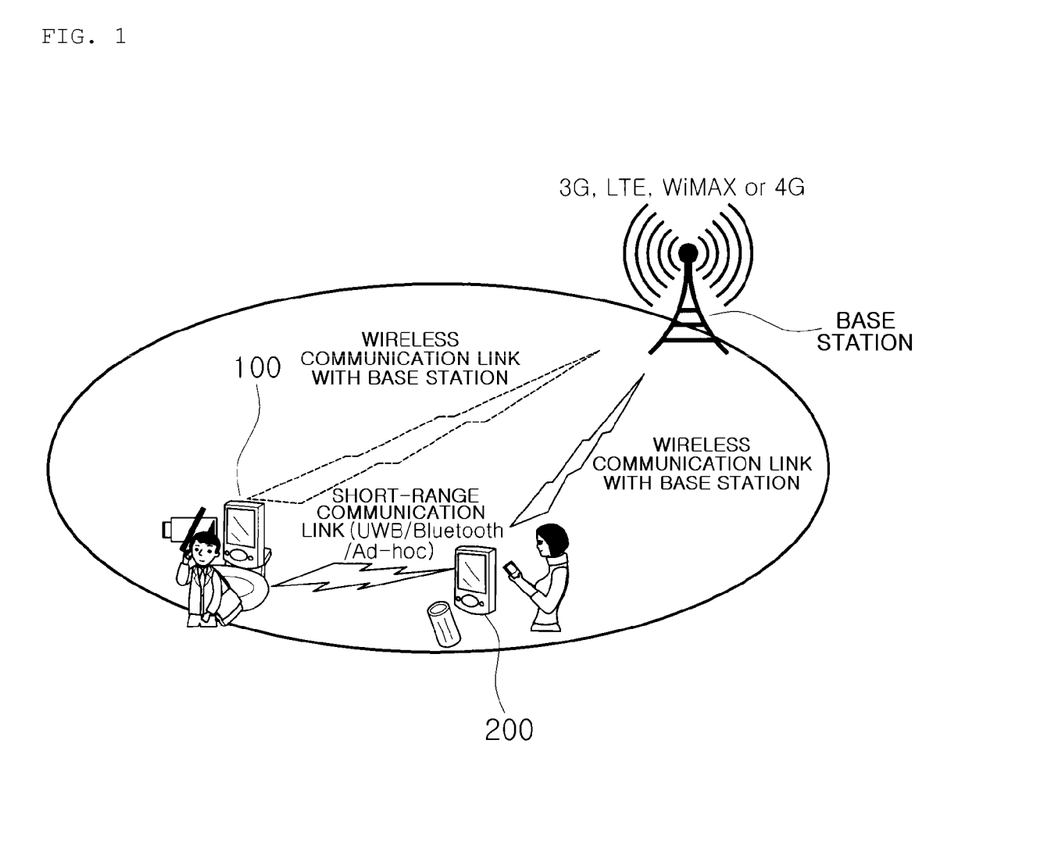
FIG. 1 shows a block diagram of an exemplary system for using a short-range wireless communication system to reduce consumed power by a portable terminal.

For example, FIG. 1 shows an exemplary system block using a wireless LAN or wireless PAN (Personal Area Network) for a portable terminal with battery limitation in short-range wireless communication with other portable terminal while the other portable terminal uses 4G mobile communication for relay to a base station.

The other portable terminal may be a portable terminal free from power consumption compared with the portable terminal in the battery limitation.

Figure 2:
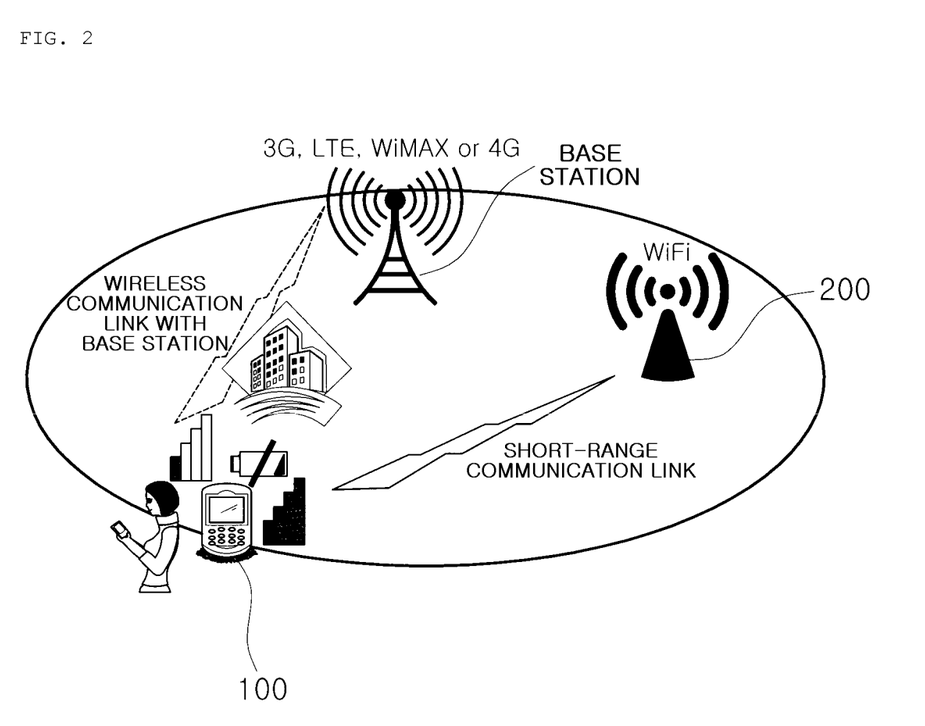
FIG. 2 shows a block diagram of another exemplary system for using a short-range wireless communication system to reduce consumed power by a portable terminal.

FIG. 2 shows a system block for sending/receiving data to/from a portable terminal by using a short-range wireless communication system, for example, a wireless LAN or high-speed wireless PAN, not 4G mobile communications.

The aforementioned FIGS. 1 and 2 illustrate reducing power consumption by utilizing a neighboring portable terminal or neighboring short-range wireless communication system while adopting short-range wireless communication, not direct wireless communication through a base station.

Portable terminals of which the battery levels drop below a certain level and which do not consume enough power or have battery limitation utilize short-range wireless communication systems, for example, a wireless LAN or wireless PAN in place of using a base station in order to reduce power consumption, as shown in FIGS. 1 and 2. In this case, however, it is also necessary to discover a device for sending or receiving data by wire or wireless to/from a base station or a mobile communication control station for managing or working as the base station in place of access to the base station of a portable terminal in a short-range wireless communication system.

Meanwhile, the aforementioned device generally broadcasts data (for example, discovery data) providing information required for a portable terminal to be connected with a short-range wireless communication system.

Therefore, it is essential that a portable terminal in a battery shortage status supplies power to a hardware module corresponding to a wireless LAN or wireless PAN included in the portable terminal in order to receive broadcast radio data packets. Continuous power supply for receiving the broadcast radio data packets results in consuming more power.

In addition, broadcast radio data packets may be lost or not normally received due to collision with broadcast radio data packets of other devices which use a short-range wireless communication system. Therefore, the portable terminal in a battery shortage status may not normally receive the broadcast radio data packets, and consume more power for discovering a short-range wireless communication system.

As a result, there is a need for a short-range wireless communication access device, a portable terminal for discovering a short-range wireless communication access device and a short-range wireless communication system, so that the portable terminal can reduce power consumption required to access the short-range wireless communication system and to use the short-range wireless communication system and also receive radio data packets for the discovery data through shared wireless media even more safely and with more probability.

DISCLOSURE

Technical Problem

In view of the above, the present invention for addressing the aforementioned problems provides a short-range wireless communication access device, a portable device for discovering a short-range wireless communication access device, and a short-range wireless communication system, which allows for sharing common time information between the portable terminal and the short-range wireless communication access device with which the portable terminal may be connected and enables the portable terminal to discover the short-range wireless communication access device by utilizing the common time information.

Further, the present invention provides a short-range wireless communication access device, a portable device for discovering a short-range wireless communication access device, and a short-range wireless communication system for implementing the short-range wireless communication access device to be discovered and/or processed just within a given time by using common time information to reduce power consumed by the portable terminal.

Further, the present invention provides a short-range wireless communication access device, a portable device for discovering a short-range wireless communication access device, and a short-range wireless communication system for avoiding collision of broadcast radio data packets with no response signals or implementing lower collision probability.

The technical scope of the present invention is not limited to the aforementioned technical scope, and other technical scope not mentioned above will be apparent to those skilled in the art from the following description.

Technical Solution

In accordance with an embodiment of the present invention, there is provided a short-range wireless communication access device. The short-range wireless communication access device includes: a first network interface configured to send/receive radio data packets through a short-range wireless communication network; a second network interface configured to receive radio signals through wireless communications different from the short-range wireless communication network; and a control unit configured to control the first network interface to send broadcast radio data packets for allowing a portable terminal to discover the short-range wireless communication access device in a specified first time range, on the basis of time synchronized with the portable terminal to access the short-range wireless communication network. In the embodiment, the control unit is configured to receive operation scenario information for controlling whether to send the broadcast radio data packets through the second network interface, and control the first network interface to cyclically send the broadcast radio data packets in accordance with a repetition cycle in the first time range based on the repetition cycle included in the operation scenario information, the specified first time range in the repetition cycle, and the time determined from the radio signal received through the second network interface. In the embodiment, the portable terminal is configured to discover the short-range wireless communication access device by using the same repetition cycle and the same specified first time range.

In the embodiment, the operation scenario information further comprises a destination address to send radio data packets received through the first network interface from the portable terminal.

In the embodiment, the control unit is configured to determine dynamically the size of a contention window used in sending the broadcast radio data packets on the basis of radio data packets sent/received in the first time range on the short-range wireless communication network, and control the first network interface to send the broadcast radio data packets depending on the size of the contention window dynamically determined in the first time range.

In the embodiment, the control unit is configured to estimate the number of other short-range wireless communication access devices on the short-range wireless communication network from the radio data packet sent/received in the first time range, and determine the size of the contention window used in sending the broadcast radio data packets on the basis of the estimated number.

In the embodiment, the control unit is further configured to estimate the number of devices accessing the short-range wireless communication network for a second time range different from the first time range, and determine the size of the contention window used in sending the broadcast radio data packet on the basis of the number of other short-range wireless communication access devices and the number of devices.

In the embodiment, the control unit is configured to repeat estimation of the number of devices and the number of other short-range wireless communication access devices in a specified cycle comprising the first time range to change the size of the contention window.

In accordance with another embodiment of the present invention, there is provided a portable terminal for discovering a short-range wireless communication access device. The portable terminal includes: a first radio signal sending/receiving unit configured to receive broadcast radio data packet sent from the short-range wireless communication access device; a second radio signal receiving unit configured to receive radio signals through wireless communications different from a short-range wireless communication network with which the short-range wireless communication access device is connected; and a control unit configured to control the connection of wireless communications to the short-range wireless communication access device on the basis of the received broadcast radio data packets. In the embodiment, the control unit is configured to control the first radio signal sending/receiving unit to discover the short-range wireless communication access device by: receiving operation scenario information of the broadcast radio data packets for discovering the short-range wireless communication access device through the second radio signal receiving unit; and cyclically receiving the broadcast radio data packets in the specified first time range in accordance with a repetition cycle on the basis of the repetition cycle comprised in the operation scenario information, the first time range specified in the repetition cycle, and the time determined from the radio signal received through the second radio signal receiving unit. In the embodiment, the short-range wireless communication access device uses the same repetition cycle and the same specified first time range to send the broadcast radio data packets.

In the embodiment, the portable terminal further includes a power control unit for controlling power to be supplied to the first radio signal sending/receiving unit, wherein the control unit is configured to control the power control unit to supply power to the first radio signal sending/receiving unit in the first time range.

In the embodiment, the control unit is configured to control the power control unit to interrupt power supplied to the first radio signal sending/receiving unit when it determines that there is no radio data packet for a time longer than a specified time in the first time range.

In accordance with another embodiment of the present invention, there is provided a short-range wireless communication system. The short-range wireless communication system includes: a short-range wireless communication access device as in the aforementioned short-range wireless communication access device; and a portable terminal, as in the aforementioned portable terminal, configured to access the short-range wireless communication access device through a short-range wireless communication network.

Advantageous Effects

As described above, the short-range wireless communication access device, the portable terminal for discovering a short-range wireless communication access device and the short-range wireless communication system in accordance with the present disclosure enable the common time information to be shared between the portable terminal and the short-range wireless access device with which the portable terminal is connected to reduce consumed power in the portable terminal, and the portable terminal to discover the short-range wireless communication access device by using the common time information.

In addition, the aforementioned short-range wireless communication access device, the portable terminal for discovering a short-range wireless communication access device, and the short-range wireless communication system in accordance with the present invention use common time information to discover and/or process a short-range wireless communication access device just within a given time to reduce power consumed in the portable terminal.

Additionally, the aforementioned short-range wireless communication access device, the portable terminal for discovering a short-range wireless communication access device, and the short-range wireless communication system in accordance with the present invention enable broadcast radio data packets without response signal to avoid collision or reduce collision probabilities.

The effects of the present invention are not limited to the aforementioned effects, and other effects will be apparent to those skilled in the art of the present invention from the following description.

| <Description of Numerals> | |
|---|---|
| 100: portable terminal | |
| 110: first radio signal sending/receiving unit | |
| 120: second radio signal receiving unit | |
| 130: power control unit | 140: input unit |
| 150: output unit | 160: memory unit |
| 170: control unit | 180: timer |
| 190: system bus/control bus | |
| 200: short-range wireless communication access device | |
| 210: first network interface | |
| 220: second network interface | |
| 230: third network interface | 240: memory unit |
| 250: control unit | 260: timer |
| 270: system bus/control bus | |
| 300: mobile communication control station | |
| 400: first network | |
| 500: second network | |

BEST MODE

The aforementioned scope, characteristics and advantages of the present invention will be more apparent from the following description provided in detail with reference to the accompanying drawings, to help those skilled in the art understand the technical scope of the present invention. In addition, if a specific description of technology well known in the art in relation to the present invention is considered to make the point of the present invention unnecessarily unclear while describing the present invention, the specific description is not provided. The embodiments in accordance with the present invention will be described in detail hereinafter with reference to the accompanying drawings.

Figure 3:
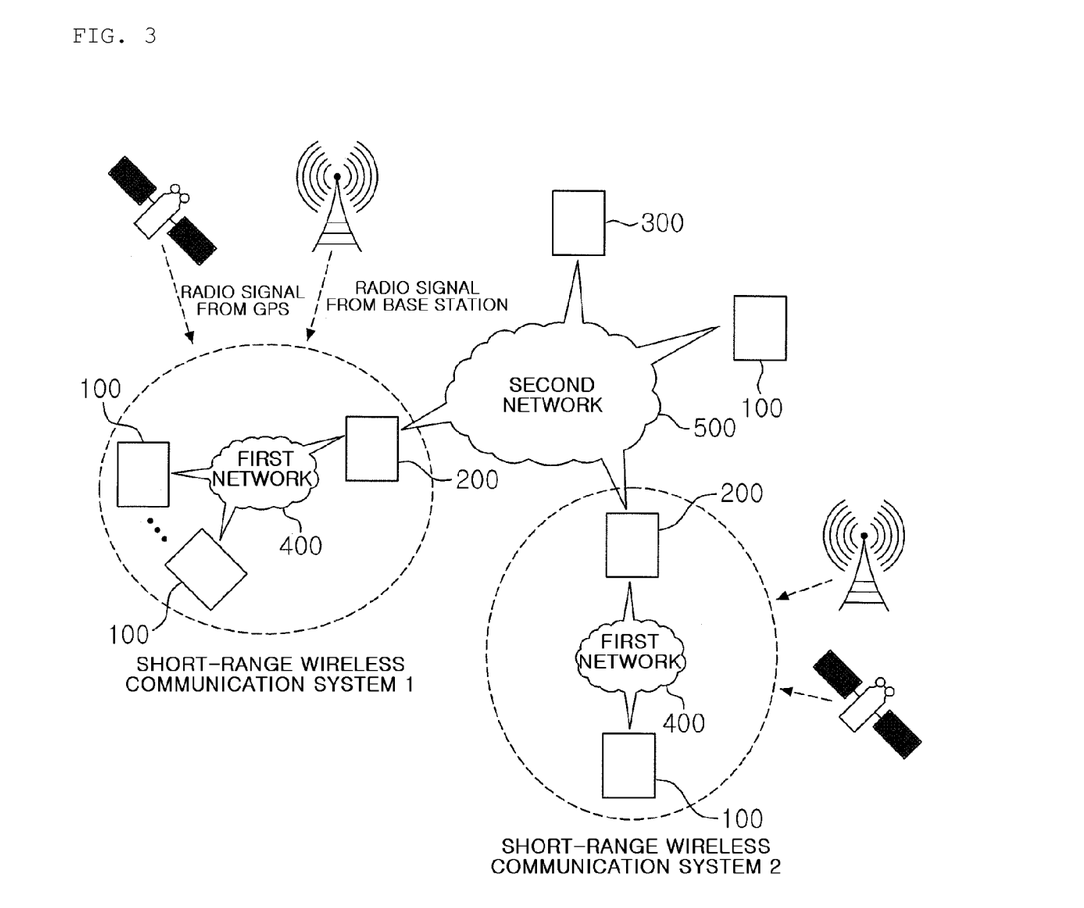
FIG. 3 shows a block diagram of an exemplary broadband system in accordance with the present invention.

Referring FIG. 3 to describe the exemplary system block diagram in accordance with the present invention, the broadband system includes one or more short-range wireless communication systems, a second network 500 for implementing communication between the short-range wireless communication systems by wireless or wire, one or more portable terminals 100 connected with the second network 500, and a mobile communication control station 300 for remotely controlling the portable terminals 100 and/or short-range wireless communication access devices 200 included in the short-range wireless communication systems.

A short-range wireless communication system includes one or more portable terminals 100, a short-range wireless communication access device 200 to make a one-to-one or N (2 or greater)-to-one connection with the one or more portable terminals 100 to be connected with the second network 500, and a first network 400 sending/receiving data by wireless by connecting the short-range wireless communication access device 200 with the portable terminals 100.

In addition, the broadband system includes a base station sending/receiving radio signals on a CDMA and/or GSM-based mobile communication system, and a GPS satellite sending GPS (Global Positioning System) radio signals for determining positions or time.

The base station may be included in the second network 500 depending on its application.

Exemplary embodiments are described herein below by using the broadband system.

The broadband system includes one or more short-range wireless communication systems and a second network 500 capable of sending/receiving data by wire or wireless between the one or more short-range wireless communication systems.

Each short-range wireless communication system includes a first network 400 capable of sending/receiving data by wireless, for example, between tens of centimeters and tens of meters. The first network 400 enables data to be sent/received between the one or more portable terminals 100 and the short-range wireless communication access device 200 by wireless.

The aforementioned first network 400 is a short-range wireless communication network, for example, a wireless LAN, UWB (Ultra wideband), Bluetooth or ZigBee, for sending/receiving data by wireless between devices in a specified format in a specified frequency band in a short range.

The first network 400 is a network capable of making a one-to-one, one-to-N (2 or greater), or N-to-N connection between devices.

The portable terminal 100 is a terminal carried by its user, and may be, for example, mobile phones, smartphones, tablet PCs, PDAs (Personal Digital Assistants) or laptop PCs.

The portable terminal 100 uses a short-range wireless communication interface equipped therein for connection with the short-range wireless communication system, and may carry out call or data communication with a remote portable terminal 100 through the first network 400 and/or the second network 500, or access web servers (not shown) connected with the second network 500 to surf the Internet.

In addition, the portable terminal 100 may receive radio signals in a data format specified in a specified frequency band from a base station for the mobile communication system and/or GPS satellites. The portable terminal 100 may extract the time information (for example, current time) included in the radio signals from the base station and/or GPS satellites. The portable terminal 100 receives broadcast radio data packets from the short-range wireless communication access device 200 at a specified time or in a time range based on the extracted current time. The portable terminal 100 may use the received radio data packet information to access a specific short-range wireless communication access device 200.

The portable terminal 100 is configured to receive an operation scenario (information) for discovering and/or accessing the short-range wireless communication access device 200 through the mobile communication control station 300, discover or access the short-range wireless communication access device 200 in accordance with the received operation scenario.

The portable terminal 100 capable of being in communication with a base station may not carry out wireless communication by using the base station, but may be in communication with other portable terminals 100 or other web servers by using the short-range wireless communication system under the control of the base station or a remote mobile communication control station 300 connected with the base station. For example, if the battery level equipped in the portable terminal 100 is below a threshold, communication may take place through the short-range wireless communication system.

The description for the portable terminal 100 will be made in more detail with reference to FIGS. 6 and 7.

The short-range wireless communication access device 200 connected with the portable terminal 100 through the first network 400 to send/receive radio data packets thereto/therefrom is a portable or non-portable device.

The short-range wireless communication access device 200 may be, for example, wireless APs (Access Points), portable phones, smartphones, tablet PCs, or a network converter used for making a connection between any networks. The short-range wireless communication access device 200 may be, for example, a device with enough battery power or a device to which power continues to be supplied externally.

The short-range wireless communication access device 200 is connected with the second network 500 by wire or wireless according to a communication protocol specified for the second network 500. In addition, the short-range wireless communication access device 200 may be connected with the first network 400 forming a different short-range wireless communication network from the second network 500 to send/receive data to/from the portable terminal 100 by wireless.

The aforementioned data may be audio data or video data sent/received through CDMA, GSM or a mobile communication system (3G or 4G) based on CDMA or GSM. The data may otherwise be data for accessing a remote server (for example, web server) by using an Internet network different from the mobile communication system.

The short-range wireless communication access device 200 may transmit radio data packets cyclically through the first network 400 to enable the one or more portable terminals 100 accessible through the first network 400 to discover the short-range wireless communication access device 200.

The radio data packets are broadcast, and include information required for accessing the short-range wireless communication access device 200. The radio data packets may include, for example, identification information for identifying mobile communication systems for a specific service provider, or address information of the short-range wireless communication access device 200 (for example, MAC address, etc.).

In addition, the short-range wireless communication access device 200 may receive radio signals from a base station, GPS satellites or the second network 500 (the base station may be included in the second network 500). The short-range wireless communication access device 200 may extract time information (current time) from the received radio signal and send the broadcast radio data packets in accordance with the extracted time information at a specified time or in a specified time range.

In general, a short-range wireless communication network, for example, a wireless LAN, may sense radio data packet collision. However, if there is no response signal of the radio data packet (e.g., Acknowledgement packet), that is, no specified destination address, it is not easy to sense collision. Therefore, because access through the short-range wireless communication access device 200 is not easy, it is necessary to avoid collision or lower collision probabilities.

To reduce this kind of collision, the short-range wireless communication access device 200 needs to determine the size of the contention window used in sending the radio data packets.

The short-range wireless communication access device 200 may be configured differently depending on its application. For example, if the short-range wireless communication access device 200 is a wireless AP or laptop computer, one thing needed is that it is configured to extract time information from a base station or GPS satellites.

The description for the short-range wireless communication access device 200 will be made in more detail herein below with reference to FIGS. 4 and 5.

The second network 500 is a network for making a connection with the short-range wireless communication access devices 200 or the portable terminals 100 in the first network 400.

The aforementioned second network 500 is, for example, a mobile communication network based on CDMA or GSM (in which the short-range wireless communication access device 200 uses a mobile communication system, for example). Otherwise, the second network 500 may be a network built with, for example, a wired network and a wireless network (for example, so-called the Internet in which the short-range wireless communication access device 200 is a wireless AP) different from a mobile communication network.

The portable terminal 100 may be in communication with other portable terminals 100 and other remote servers by using the second network 500.

The mobile communication control station 300 sends operation scenario information to one or more portable terminals 100 and/or one or more short-range wireless communication access devices 200. The operation scenario information is required to enable the portable terminal 100 to access the short-range wireless communication access device 200 and/or enable the short-range wireless communication access device 200 to allow access by the one or more portable terminal 100.

The operation scenario information may be sent by radio signal through a base station that may be included in, for example, the second network 500, or a base station independent of the second network 500 depending on its application.

For example, the operation scenario information includes cycle information for sending the broadcast radio data packets by the short-range wireless communication access device 200 (for example, one minute) and a time range for sending the broadcast radio data packets within the periods (for example, 10 seconds). Furthermore, the operation scenario information may further include cycle start time information (time information that should be synchronized), current time information or location information of the time range in the cycle.

Therefore, the portable terminal 100 and the short-range wireless communication access device 200 receiving the aforementioned operation scenario information may implement time synchronization between the portable terminal 100 and the short-range wireless communication access device 200 in accordance with the received information.

Meanwhile, the operation scenario sent to the short-range wireless communication access device 200 may further include other information. The operation scenario sent to the short-range wireless communication access device 200 may further include, for example, a destination address (may be, for example, the mobile communication control station 300) to which the short-range wireless communication access device 200 sends the data received from the portable terminal 100.

The portable terminal 100 using the aforementioned broadband system may implement time synchronization with the short-range wireless communication access device 200, thus to contribute to reducing power consumption for the connection of the portable terminal 100 with the first network 400.

Figure 4:
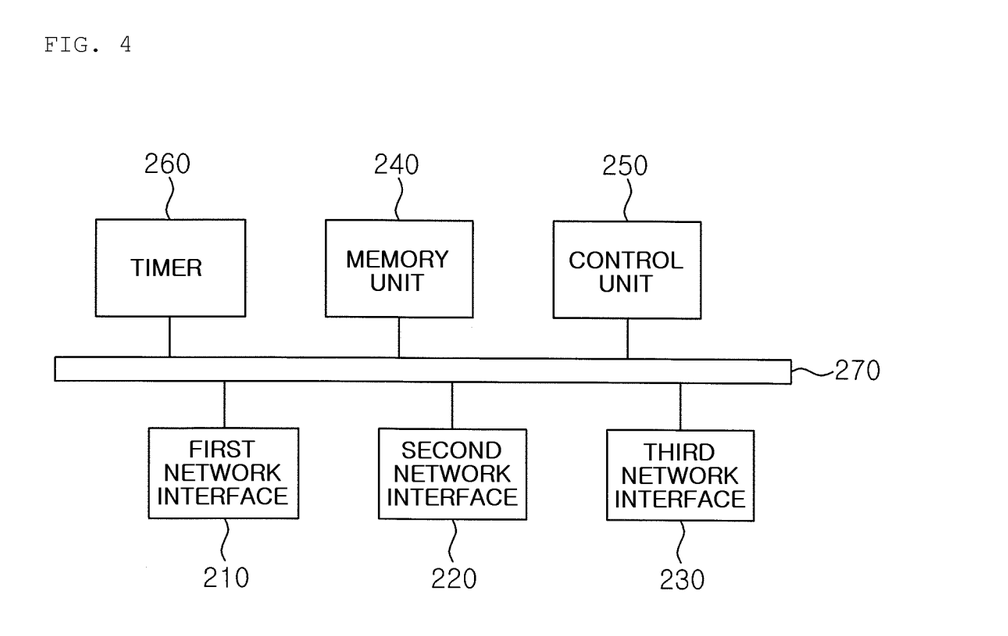
FIG. 4 shows a block diagram of an exemplary short-range wireless communication access device.

FIG. 4 shows a block diagram of an exemplary short-range wireless communication access device 200.

Referring to FIG. 4, the short-range wireless communication access device 200 includes a first network interface 210, a second network interface 220, a third network interface 230, a memory unit 240, a control unit 250, a timer 260, and a system bus/control bus 270.

Some of the components may be omitted if required, and components not shown in FIG. 4 may be included in the exemplary block diagram of FIG. 4.

Describing each component of the short-range wireless communication access device 200, the first network interface 210 receives and sends radio data packets by wireless through the short-range wireless communication network. The first network interface 210 includes an antenna compliant with a specific communication protocol type of the first network 400.

For example, the first network 400 may be a wireless network enabling short-range communication, for example, Bluetooth, ZigBee, a wireless LAN or UWB. The first network interface 210 has an antenna for sending/receiving radio data packets by wireless at a frequency adapted to each network type.

The first network interface 210 converts the analog radio data packets received through the antenna to digital data packets. The converted digital data packets may be sent to the control unit 250 under the control of the control unit 250.

The second network interface 220 receives radio signals through wireless communication different from the first network 400 which is a short-range wireless communication network. The aforementioned second network interface 220 is equipped with, for example, an antenna for receiving radio signals sent by the base station of a mobile communication system and/or an antenna for receiving radio signals sent from GPS satellites.

If the short-range wireless communication access device 200 is installed indoors, the second network interface 220 may further include an external device functioning as an interface to receive GPS signals and then decode the received data so that the data included in the GPS signals can be transmitted to the short-range wireless communication access device 200.

In addition, the second network interface 220 may send radio signals to a base station depending on its application.

The aforementioned second network interface 220 is configured to be capable of extracting time information (current time, for example, composed of hour, minute, and second) at least from a base station and/or GPS satellites. Furthermore, the second network interface 220 may be further configured to extract data from radio signals depending on its application.

The third network interface 230, which may be omitted depending on the application of the short-range wireless communication access device 200, enables the data received through the first network interface 210 to be sent, or the data received through the third network interface 230 to be sent through the first network interface 210 under the control of the control unit 250.

The aforementioned third network interface 230 may be, for example, an interface for sending/receiving data to/from the Internet network (see, the second network 500 shown in FIG. 3) through a wired LAN.

In this case, the second network interface 220 and/or the third network interface 230 may receive the operation scenario for broadcast radio data packets from the mobile communication control station 300 in order to identify or recognize the short-range wireless communication access device 200 of the portable terminal 100.

The aforementioned operation scenario includes, for example, a specified cycle which amounts to a whole period at sending broadcast radio data packets and a time range (first time range) in which the broadcast radio data packets may be sent in the time range of the specified cycle. In addition, the operation scenario may further include other information (for example, the destination address (IP address) to be connected).

The memory unit 240 includes a volatile memory and/or a nonvolatile memory. The memory unit 240 stores application programs used in the short-range wireless communication access device 200, or temporary data required by the application programs.

The timer 260 is a device that may store and update current time under the control of the control unit 250 and updates the current time as time elapses. The timer 260 may be configured with a clock oscillator (not shown) equipped in the short-range wireless communication access device 200.

The control unit 250 controls each component of the short-range wireless communication access device 200. The control unit 250 is equipped with an execution unit for executing, for example, programs, and uses the programs driven in the execution unit and stored in the memory unit 240 to control each component. Further, the control unit 250 is equipped with a hardware logic specialized for specific applications and uses this hardware logic to control other blocks.

For example, the control unit 250 may send the data received from the first network 400 to a specified destination in the second network 500 (through the second network interface 220 or the third network interface 230). On the contrary, the control unit 250 may send the data received from the second network 500 to the one or more portable terminal 100 connected with the first network 400.

Further, the control unit 250 determines current time from the radio data packets received through the second network interface 220 (or data packets received through the third network interface 230), establishes or updates the determined current time at the timer 260. The radio data packets are sent cyclically, to enable the current time of timer 260 to continue to be accurate.

The current time is also sent to the portable terminal 100 (by using the same radio data packets or different radio data packets). As a result, the portable terminal 100 may be configured to be synchronized with or is matched with the short-range wireless communication access device 200 each other in terms of current time.

In addition, the control unit 250 sends broadcast radio data packets that the portable terminal 100 may recognize in accordance with the received operation scenario on the basis of the current time by controlling the first network interface 210. The broadcast radio data packets to be sent are also controlled to be sent within a specified time range.

The broadcast radio data packets include the information to enable at least an external portable terminal 100 to access the short-range wireless communication access device 200 through the first network 400. The control unit 250 controls the first network interface 210 so that the broadcast radio data packets as described above may be sent within a specified time range cyclically in accordance with the specified cycle included in the operation scenario.

Additionally, the control unit 250 may estimate or predict the number of other devices (that use the same frequency band of the short-range wireless communication network) and/or other short-range wireless communication access devices 200 (used as the same access devices in the short-range wireless communication network and operated in conformity with the operation scenario in accordance with the present invention) in order to foresee collision that may occur in a specified time range (first time range).

Based on the estimate, the control unit 250 may determine the size of the contention window to be used for the broadcast radio data packets. The size of the contention window determined as described above contributes to maximizing avoidance or reduction of collision. As a result, the portable terminal 100 may identify or access the short-range wireless communication access device 200 easily.

Determining the size of the contention window will be described in more detail with reference to FIG. 5.

For better understanding, both the timer 260 and the control unit 250 are described, but it is not essential, and the control unit 250 may function as the timer 260. For example, it is allowed to use a clock oscillator (not shown) received by the control unit 250 so that the control unit 250 may carry out functions of the timer 260.

The system bus/control bus 270 includes a parallel bus, and a serial bus and/or interrupt line for sending/receiving data or control signals between the control unit 250 and other blocks.

Through the system bus/control bus 270, the control unit 250 may send data to each block, and receive data from each block, and carry out subsequent processing because it may be aware of receiving specific data.

Figure 5:
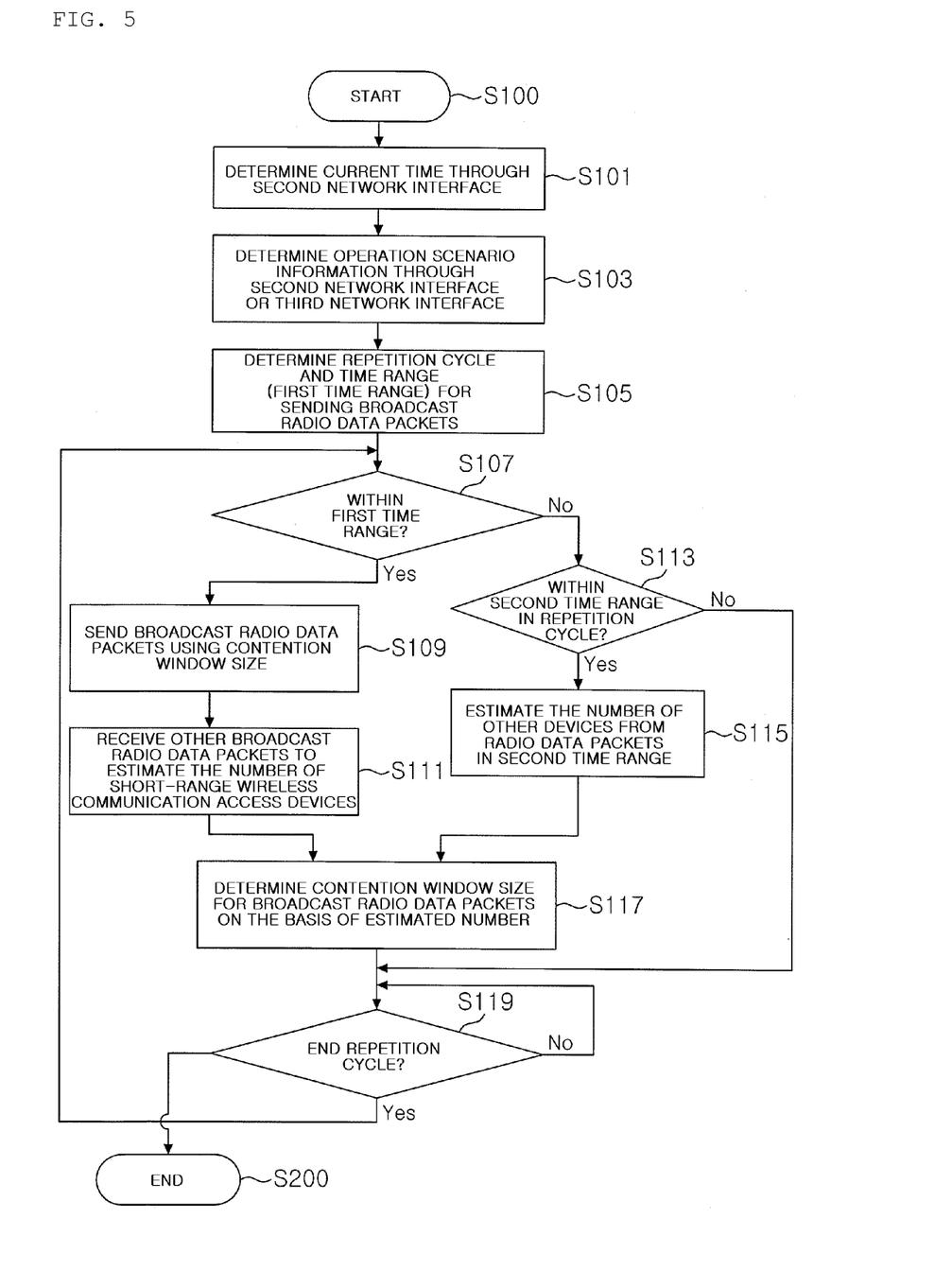
FIG. 5 shows a control flow for determining time synchronization and the size of a contention window carried out in a short-range wireless communication access device.

FIG. 5 shows a control flow for determining time synchronization and the size of a contention window carried out in the short-range wireless communication access device 200. The control flow may be carried out by using the block diagram of FIG. 4, preferably under the control of the control unit 250.

The control flow may start after power is supplied to, for example, the short-range wireless communication access device 200 at operation S100.

At operation S101, time information is received through the second network interface 220 to determine a current time. The determined current time is used by the timer 260 to update or establish a current time.

Operation S101 may be repeated, and thus, the timer 260 may be updated repeatedly. The timer 260 may also be configured to continue to update the current time for itself after receiving the current time.

Subsequently at operation S103, radio data packets or data packets by wire are received through the second network interface 220 or the third network interface 230. The short-range wireless communication access device 200 determines operation scenario information from the received packets. The operation scenario information is related to the broadcast radio data packets to be used for access to the short-range wireless communication access device 200 by the portable terminal 100.

The packets received as described above may be, for example, data packets received from the mobile communication control station 300, originated by the mobile communication control station 300 cyclically or non-cyclically.

At operation S105, the entire cycle repeating in accordance with the determined operation scenario and the time range to send the broadcast radio data packets in the repeating entire cycle are determined.

The aforementioned cycle (for example, one minute) and the time range (for example, 10 seconds) may be specified and allocated on the basis of a specific time from the received current time, and the cycle start time information for the aforementioned allocation may be further included in the operation scenario.

The operation scenario information may be sent to other short-range wireless communication access devices 200 that may use at least the same short-range wireless communication network. The information may also be sent to the portable terminal 100 to use the short-range wireless communication access device 200 for sending/receiving data. Therefore, the radio data packets may be sent/received through the short-range wireless communication network in accordance with the scenario agreed each other.

After operation S105, the short-range wireless communication access device 200 determines whether it is within a specified time range (first time range) from the start time of the repeating cycle at operation S107. If it is within the specified time range, the control flow goes to operation S109, and otherwise to operation S113.

In case where there is a plurality of short-range wireless communication access devices 200 in the same short-range wireless communication network, if each short-range wireless communication access device 200 thus sends broadcast radio data packets at any time, the portable terminal 100 unnecessarily consumes much power to receive the radio data packets. Therefore, if the radio data packets are sent within the same given time range, management thereof may be even more power-efficient for the portable terminal 100.

At operation S109, the short-range wireless communication access device 200 sends the broadcast radio data packets using a contention window of established size. It is not easy to determine whether the radio data packets collide. Therefore, it initially (for example, in sending them for the first time) sends the broadcast radio data packets using the maximum-sized window (Wmax) established in the short-range wireless communication network.

Operation S109 may be carried out just once to send the broadcast radio data packets, or multiple times within a first time range.

In this case, the contention window size is generally used to enable the short-range wireless communication network to share wireless media (or wireless communication channels) with different devices while avoiding collision, or to send the radio data packets again successfully after collision.

For example, a wireless LAN which is one of short-range wireless communication networks is based on carrier sensing and the contention window in operation, and randomly selects a contention window size to send radio data packets at the boundary of each slot time. It reduces the contention window size selected (for example, on the basis of the slot time) through carrier sensing when a communication channel is idle, and sends radio data packets when the value is 0.

As such, too small contention windows frequently cause collision so that it may be impossible to send the broadcast radio data packets to the portable terminal 100. Too big contention windows waste wireless channel resources. Furthermore, since an acknowledge packet is not received for the broadcast radio data packets, it is not easy to determine the size of an adapted contention window.

The following operations illustrate a method for determining the size of an adapted contention window in these circumstances.

At operation S111, the number of other short-range wireless communication access devices 200 are estimated, that may access the same short-range wireless communication network. Operation S111 may be carried out before S109, or within a specified time range (first time range) also for carrying out S109.

Operation S111 may be carried out repeatedly. Consequently, more accurate estimation may be achieved. For example, it is possible to more accurately and stably estimate the number obtained from the previous repetition by allocating a weight to each repetition (with the highest weight given to the current repetition).

Operation S111 may be configured to stop if there is no radio data packet on the communication channel for a given specified time (for example, the maximum size of the contention window (Wmax)) by monitoring the communication channel of the short-range wireless communication network.

At operation S113, the control flow determines whether the time range is a time range (second time range, for example, which may be a time range (10 seconds) just before or just behind the first time range. The second time range may be included in the operation scenario, or determined by the short-range wireless communication access device) different from the first time range (time range specified in accordance with the operation scenario) in the repetition cycle.

If it is not the second time range, the operation goes to S119 to carry out other operation (for example, sending/receiving radio data packets to/from other devices or the portable terminal 100).

If it is within the second time range, the radio data packets sent/received through the short-range wireless communication network within the second time range are monitored. The monitoring aims to estimate the number of devices that use the short-range wireless communication network (in this case, the portable terminal 100 controlled in accordance with the operation scenario may not be included).

The aforementioned estimation of the number of devices may be repeated in the repetition cycle. Repeated estimation aims for obtaining the more accurate number of devices. For example, weights may be used.

At operation S117, on the basis of the estimated number, the size of the contention window to be used for broadcast radio data packets is determined.

Determination of the contention window size may be based on the estimated number of short-range wireless communication access devices 200 and/or the estimated number of devices. Preferably, determination of the contention window size by means of a combination of the aforementioned estimations contributes to further avoiding or reducing the risk of collision (depending on target collision probabilities).

In this case, the above description is based on the estimated numbers, but it is not essential, and determination of the contention window size may be based on the number of radio data packets monitored in a specific time range (first time range and/or second time range).

Operation S117 may be repeated depending on the repetition cycle. Therefore, the repetition contributes to more stable update of the contention window size to reduce or avoid the risk of collision. In this process, it is allowed to use various algorithms to update the contention window size. For example, different weights for each repetition cycle (the highest weight for the current repetition cycle) may be given to determine the contention window size, or determination of the contention window size is not based on the currently estimated number if the previously estimated number and the currently estimated number are above a threshold. This is for implementing an algorithm for more stably keeping the contention window size.

The aforementioned operation S117 (further operations S111 and S115) aims to determine the contention window size to avoid or reduce the risk of collision of the broadcast radio data packets within the first time range.

Therefore, operation S111 and/or operation S115 are not just for estimating the numbers, and also for monitoring the radio data packets sent/received in an appropriate time range. Based on the result, the contention window size may be determined at operation S117.

For example, the operation S111 and/or the operation S115 estimate the number based on the number of radio data packets or the address (source address) included in the radio data packets. On the basis of the estimated number the contention window size may be determined at operation S117.

The contention window size may be easily determined on the basis of the number of radio data packets or the number of devices or other short-range wireless communication access devices 200 because the contention window size depends on the number of other devices or other short-range wireless communication access devices 200, or has a functional relation therewith. For example, the contention window size may be determined by storing the contention window size corresponding to the relation or functional relation as a table in the memory unit 240.

Subsequently at operation S119, it is determined whether to stop the current cycle and start the next repetition cycle, and depending on the determination, the control flow goes to operation S119 for determining whether to end the repetition cycle, or returns to operation S107.

If power is interrupted at operation S119 or other operation, or a control command is received from the mobile communication control station 300 for not functioning as a short-range wireless communication access device 200 anymore, this control flow may end at operation S200.

In accordance with the control flow illustrated in FIG. 5, synchronization with the portable terminal 100 is implemented at an agreed time so that the radio data packets used by the portable terminal 100 to discover the short-range wireless communication access device 200 may be more stably sent.

Figure 6:
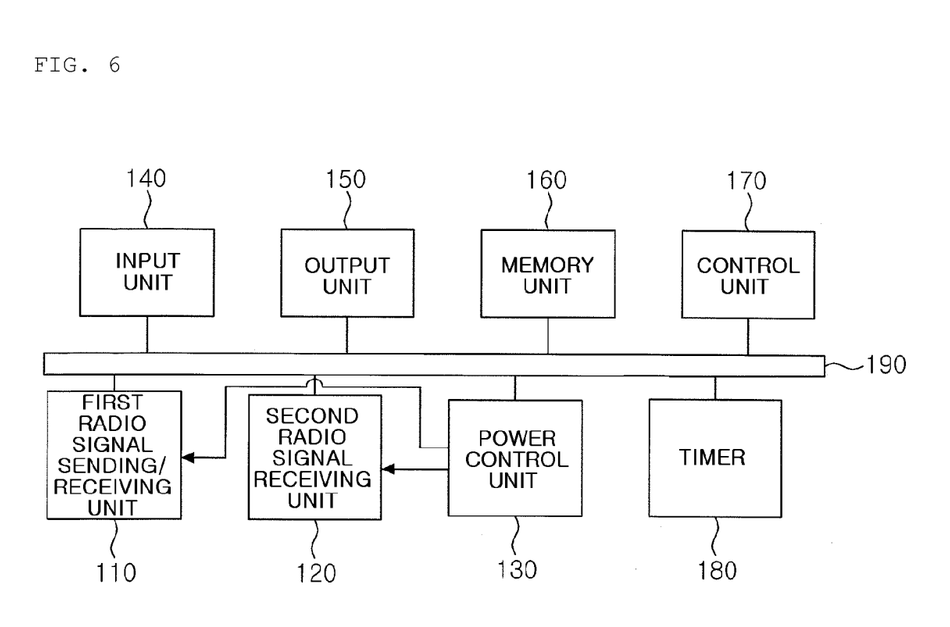
FIG. 6 shows a block diagram of an exemplary portable terminal.

FIG. 6 shows a block diagram of an exemplary portable terminal 100.

Referring to FIG. 6, the portable terminal 100 includes a first radio signal sending/receiving unit 110, a second radio signal receiving unit 120, a power control unit 130, an input unit 140, an output unit 150, a memory unit 160, a control unit 170, a timer 180, and a system bus/control bus 190.

Some of the components may be omitted if required, and components not shown in FIG. 6 may be further included in the exemplary block diagram of FIG. 6.

Describing each component k of the portable terminal 100, the input unit 140 is an interface to receive inputs from a user who uses the portable terminal 100.

The input unit 140 includes, for example, touch buttons, a touch panel and a microphone to receive user's inputs.

The user may request the control unit 170 to be connected with the first network 300 by means of the input unit 140.

The output unit 150 includes a display, for example, an LED (Light-Emitting Diode), a loudspeaker and an earphone jack to output video, images or audio for the user under the control of the control unit 170.

The first radio signal sending/receiving unit 110 receives and sends radio data packets through the first network 400 which implements short-range wireless communications. The first radio signal sending/receiving unit 110 includes an antenna compliant with a specific communication protocol type of the first network 400.

For example, the first network 400 may be a wireless network enabling short-range communication, for example, Bluetooth, ZigBee, a wireless LAN and UWB, and the first radio signal sending/receiving unit 110 is equipped with an antenna adapted to sending/receiving radio signals at a frequency adapted to each network type.

In addition, the first radio signal sending/receiving unit 110 may extract data packets from radio signals of the received radio data packets to send them to the control unit 170.

The second radio signal receiving unit 120 includes an antenna to receive radio signals using a communication protocol different from those for the first network 400 which implements short-range wireless communications.

The radio signal may be, for example, radio signals from a base station which is any entity of a mobile communication system, or GPS radio signals from GPS satellites.

The second radio signal receiving unit 120 may receive radio signals and also send radio signals through the antenna if required (for example, if a mobile communication system is used). The second radio signal receiving unit 120 enables the control unit 170 to determine a current time based on the received radio signals.

The power control unit 130 supplies or interrupts power from a battery (not shown) to an appropriate block under the control of the control unit 170 that determines whether to supply or interrupt power to each block of the portable terminal 100.

In particular, the power control unit 130 is configured to supply or interrupt power to the first radio signal sending/receiving unit 110 and/or the second radio signal receiving unit 120.

Accordingly, it is possible to reduce power unnecessarily consumed by interrupting power to the first radio signal sending/receiving unit 110 or the second radio signal receiving unit 120 at any time.

The memory unit 160 may include a volatile memory and/or a nonvolatile memory. The memory unit 160 is for storing application programs used in the portable terminal 100, or temporarily storing temporary data required by the application programs.

The timer 180 is a block that may store and update the current time under the control of the control unit 170, and update the current time as time elapses. The timer 180 may be configured by using a clock oscillator (not shown) equipped in the portable terminal 100.

The control unit 170 controls each component of the portable terminal 100. The control unit 170 is equipped with, for example, an execution unit for executing programs to control each block by using the programs driven in the execution unit and stored in the memory unit 160. In addition, the control unit 170 is further equipped with a hardware logic specialized for a specific application, and uses it to control other blocks.

For example, the control unit 170 may establish a connection with the short-range wireless communication access device 200 of the short-range wireless communication system if the battery level is identified below a threshold during connection with the mobile communication system, or the user requests connection with the short-range wireless communication system entered through the input unit 140.

To this end, the control unit 170 may determine time information (current time) based on the radio signal received through the second radio signal receiving unit 120, establish the determined current time in the timer 180 or update the timer 180.

Further, the control unit 170 receives operation scenario information from the mobile communication control station 300 through the second radio signal receiving unit 120, and stores it in the memory unit 160.

The control unit 170 determines a repetition cycle included in the operation scenario information and time range (a first time range) for sending the broadcast radio data packets, and controls the power control unit 130 in accordance with the operation scenario.

Accordingly, the control unit 170 controls the current time output from the timer 180 to be synchronized with the repetition cycle, and the power control unit 130 to supply power to the first radio signal sending/receiving unit 110 during the first time range in the repetition cycle. Also, the control unit 170 controls receiving the broadcast radio data packets from the short-range wireless communication access device 200 of the short-range wireless communication network in the first time range, and connection with the short-range wireless communication network on the basis of the received radio data packets.

Since the short-range wireless communication access device 200 is also synchronized with the same time information, time synchronization between the portable terminal 100 and the short-range wireless communication access device 200 may also be implemented.

For other time ranges than the first time range, the control unit 170 may control the power control unit 130 to interrupt power supplied to the first radio signal sending/receiving unit 110 in order to reduce power consumed through the first radio signal sending/receiving unit 110 before a connection is made with short-range wireless communication access device 200.

In addition, the control unit 170 may control the power control unit 130 to interrupt power supply to the second radio signal receiving unit 120 after accessing through the short-range wireless communication access device 200.

The control unit 170 may also determine there is no more broadcast radio data packets if radio data packets are not monitored or sensed for a given period of time longer than a specified time (for example, Wmax) in the first time range, and then control the power control unit 130 to interrupt power supply to the first radio signal sending/receiving unit 110.

The aforementioned control process by means of the control unit 170 may contribute to effectively reducing power consumed in the portable terminal 100.

In here, both the timer 180 and the control unit 170 in FIG. 6 are described separately for easy understanding, but not limited thereto. The control unit 170 may execute the function of the timer 180. For example, a clock oscillator (not shown) received by the control unit 170 may be used so that the control unit 170 may execute the function of the timer 180.

The system bus/control bus 190 includes a parallel bus, a serial bus and/or an interrupt line for sending/receiving data or control signals between the control unit 170 and other blocks.

Through the system bus/control bus 190, the control unit 170 may send data to each block, receive data from each block, and carry out subsequent processing because it may be aware of receiving specific data.

Figure 7:
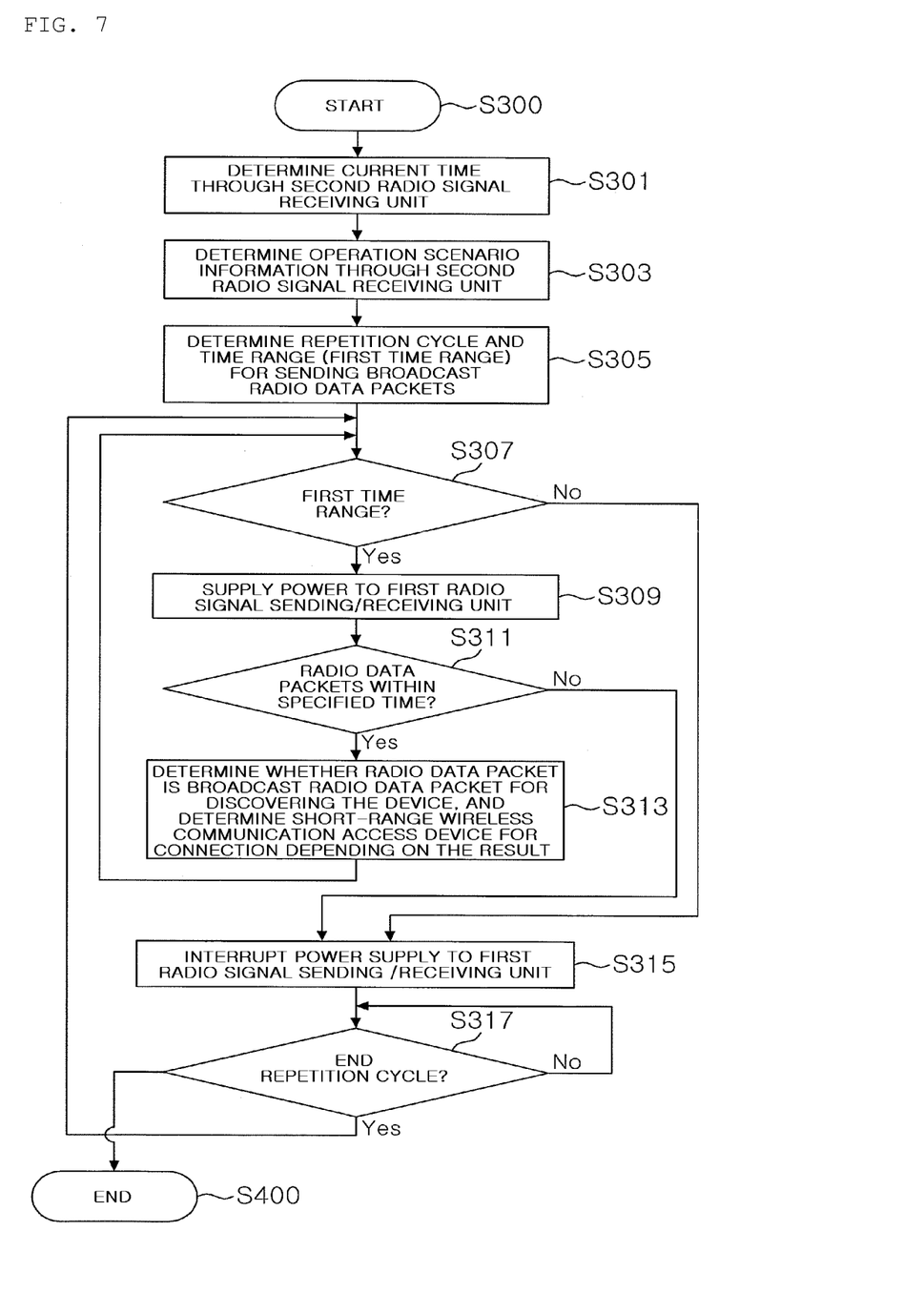
FIG. 7 shows a control flow for time synchronization and power control carried out in a portable terminal.

FIG. 7 shows a control flow for time synchronization and power control carried out in the portable terminal 100. This control process may be carried out by using the block diagram shown in FIG. 6, and preferably through the control unit 170.

Because the control flow shown in FIG. 7 is partially similar to and corresponds to the one shown in FIG. 5, it is not described in fully detail. The control flow shown in FIG. 7 may start at operation S300, for example, with user's request through the input unit 140 or where the battery level of the portable terminal 100 is below a threshold.

At operation S301, time information is received through the second radio signal receiving unit 120 to determine a current time. The determined current time is used to update or be established in the timer 180. Operation S301 may be repeated, and updating the timer 180 may thus be repeated.

At operation S303, the radio data packets are received through the second radio signal receiving unit 120 to determine the operation scenario information for the broadcast radio data packets from the received packet to be used by the portable terminal 100 accessing the short-range wireless communication access device 200.

The packets received as described above may be, for example, data packets received from the mobile communication control station 300, and may be configured to be originated cyclically or non-cyclically from the mobile communication control station 300. Otherwise, they may be received from the mobile communication control station 300 and stored in the portable terminal 100 (that is, before starting S300).

At operation S305, the entire repetition cycle repeating in conformity with the determined operation scenario and the time range (first time range) for sending broadcast radio data packets in the repeating entire cycle are determined.

After operation S305, the portable terminal 100 determines whether it is the specified time range from the start time of repetition cycle at operation S307. If it is the specified time range, the control flow goes to operation S309, and, otherwise, to operation S315.

In this control flow, the first time range is assumed to be allocated from the boundary of starting the entire repetition cycle, but not limited thereto.

At operation S309, the power control unit 130 is controlled to supply power to the first radio signal sending/receiving unit 110.

Subsequently, at operation S311, it is determined whether the communication channel of short-range wireless communication network has radio data packets within the specified time.

If the short-range wireless communication network does not have any radio data packets, it is determined that there are no more broadcast radio data packets for discovering the short-range wireless communication access device 200 in the current first time range. The control flow then advances to operation S315.

If it has radio data packets, the control flow goes to operation S313 to determine whether the received radio data packets are the radio data packets used for the short-range wireless communication access device 200. Accordingly, the information in the radio data packets is used to determine whether to connect the appropriate short-range wireless communication access device 200, and this control flow may end. Otherwise, the control flow is configured to return to operation S307, to further find other short-range wireless communication access devices 200.

If the portable terminal 100 determines to make a connection with the short-range wireless communication access device 200, the connection with the short-range wireless communication access device 200 is made through the short-range wireless communication network to use the first network 400.

At operation S315, the power control unit 130 is controlled to interrupt power supplied to the first radio signal sending/receiving unit 110.

Subsequently at operation S317, it may be determined whether to end the repetition cycle, repeat at operation S317 or return to operation S307 to repeat the process depending on the determination.

The control flow may flow to operation S400 to end this control flow. For example, if the battery has no power or if the user requests ending the control flow, the operation may end.

Using the control flow shown in FIG. 7 contributes to reducing consumed power in the portable terminal 100 and making a connection with an external short-range wireless communication access device 200.

While the present invention has been shown and described, the present invention is not limited to the aforementioned description and accompanying drawings. It will be understood by those skilled in the art that various substitutions, changes and modifications may be made without departing from the scope of the present invention as defined in the following claims.

The invention claimed is:

1. A short-range wireless communication access device, comprising:
   a first network interface configured to send/receive radio data packets through a short-range wireless communication network;
   a second network interface configured to receive radio signal through wireless communications different from the short-range wireless communication network; and
   a control unit configured to control the first network interface to send broadcast radio data packets for allowing a portable terminal to discover the short-range wireless communication access device in a first time range, on the basis of time synchronized with the portable terminal to access the short-range wireless communication network,
   wherein the control unit is configured to receive operation scenario information for controlling whether to send the broadcast radio data packets through the second network interface, and control the first network interface to cyclically send the broadcast radio data packets in accordance with a repetition cycle in the first time range based on the repetition cycle included in the operation scenario information, the first time range in the repetition cycle, and time determined from the radio signal received through the second network interface; and the portable terminal is configured to discover the short-range wireless communication access device by using the same repetition cycle and the same first time range.

2. The short-range wireless communication access device of claim 1, wherein the operation scenario information further comprises a destination address to send radio data packets received through the first network interface from the portable terminal.

3. The short-range wireless communication access device of claim 1, wherein the control unit is configured to determine dynamically a size of a contention window used in sending the broadcast radio data packets on the basis of radio data packets sent/received in the first time range on the short-range wireless communication network, and control the first network interface to send the broadcast radio data packets depending on the size of the contention window dynamically determined in the first time range.

4. The short-range wireless communication access device of claim 3, wherein the control unit is configured to estimate a number of other short-range wireless communication access devices on the short-range wireless communication network from the radio data packets sent/received in the first time range, and determine the size of the contention window used in sending the broadcast radio data packets on the basis of the estimated number.

5. The short-range wireless communication access device of claim 4, wherein the control unit is further configured to estimate a number of devices accessing the short-range wireless communication network for a second time range different from the first time range, and determine the size of the contention window used in sending the broadcast radio data packets on the basis of the number of other short-range wireless communication access devices and the number of devices.

6. The short-range wireless communication access device of claim 5, wherein the control unit is configured to repeat estimation of the number of devices and the number of other short-range wireless communication access devices in a specified cycle comprising the first time range to change the size of the contention window.

7. A portable terminal for discovering a short-range wireless communication access device, comprising:

a first radio signal sending/receiving unit configured to receive broadcast radio data packets sent from the short-range wireless communication access device;

a second radio signal receiving unit configured to receive radio signal through wireless communications different from a short-range wireless communication network with which the short-range wireless communication access device is connected; and a control unit configured to control a connection of wireless communications to the short-range wireless communication access device on the basis of the broadcast radio data packets, wherein the control unit is configured to control the first radio signal sending/receiving unit to discover the short-range wireless communication access device by:

receiving operation scenario information of the broadcast radio data packets for discovering the short-range wireless communication access device through the second radio signal receiving unit, and cyclically receiving the broadcast radio data packets in a first time range in accordance with a repetition cycle on the basis of the repetition cycle comprised in the operation scenario information, the first time range in the repetition cycle, and time determined from the radio signal received through the second radio signal receiving unit; and wherein the short-range wireless communication access device uses the same repetition cycle and the first time range to send the broadcast radio data packets.

8. The portable terminal of claim 7, further comprising: a power control unit for controlling power to be supplied to the first radio signal sending/receiving unit, wherein the control unit is configured to control the power control unit to supply power to the first radio signal sending/receiving unit in the first time range.

9. The portable terminal of claim 8, wherein the control unit is configured to control the power control unit to interrupt power supplied to the first radio signal sending/receiving unit when it determines that there is no radio data packets for a time longer than a specified time in the first time range.

* * * * *